United States Patent
Yamakawa et al.

(10) Patent No.: US 9,322,315 B2
(45) Date of Patent: Apr. 26, 2016

(54) PARTICULATE COLLECTION FILTER STATE DETECTION DEVICE

(75) Inventors: Takashi Yamakawa, Ibi-Gun (JP); Yasuhiro Ishii, Ibi-Gun (JP); Daisuke Minoura, Ibi-Gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 109 days.

(21) Appl. No.: 14/122,678

(22) PCT Filed: Mar. 7, 2012

(86) PCT No.: PCT/JP2012/055869
§ 371 (c)(1),
(2), (4) Date: Nov. 27, 2013

(87) PCT Pub. No.: WO2013/132624
PCT Pub. Date: Sep. 12, 2013

(65) Prior Publication Data
US 2014/0090460 A1    Apr. 3, 2014

(51) Int. Cl.
*G01M 15/00* (2006.01)
*F01N 9/00* (2006.01)
*F01N 11/00* (2006.01)
*G01M 15/10* (2006.01)

(52) U.S. Cl.
CPC ............. *F01N 9/002* (2013.01); *F01N 9/007* (2013.01); *F01N 11/002* (2013.01); *G01M 15/106* (2013.01); *Y02T 10/47* (2013.01)

(58) Field of Classification Search
CPC ............................ F01N 9/002; G01M 15/106
USPC .............................................. 73/114.76, 659
See application file for complete search history.

(56) References Cited

U.S. PATENT DOCUMENTS

2007/0056270 A1 *  3/2007  Liimatta et al. ................. 60/295
2007/0157609 A1    7/2007  Venghaus et al.
(Continued)

FOREIGN PATENT DOCUMENTS

JP    60-085214       5/1985
JP    05-288037 A    11/1993
(Continued)

OTHER PUBLICATIONS

Author: Pranati R. Surve, Title: Diesel Particulate Filter Diagnostics Using Correlation and Spectral Analysis, Date: Jul. 25, 2008, Publication: ECE Masters Thesis, Purdue University, Purdue e-Pubs, Pages total: 105.*

(Continued)

*Primary Examiner* — Lisa Caputo
*Assistant Examiner* — Roger Hernandez-Prewitt
(74) *Attorney, Agent, or Firm* — Mori & Ward, LLP

(57) ABSTRACT

A filter state detection device includes a first pressure detection part, a second pressure detection part, and a filter state determination part. The filter state determination part is configured to include an operation part and a storage part. The operation part is configured to apply Fourier transformation to each of values of first and second pressures to obtain first and second spectral intensities and/or phases at a zero frequency and first and second spectral intensities and/or phases at a predetermined frequency and configured to compare the first spectral intensity and/or phase at a zero frequency and the first spectral intensity and/or phase at the predetermined frequency as a first group against the second spectral intensity and/or phase at a zero frequency and the second spectral intensity and/or phase at the predetermined frequency as a second group to determine a state of a filter.

18 Claims, 6 Drawing Sheets

(56) References Cited

U.S. PATENT DOCUMENTS

2008/0078236 A1* 4/2008 Mital et al. .................... 73/38
2009/0205413 A1 8/2009 Yamauchi et al.

FOREIGN PATENT DOCUMENTS

| JP | 07-119524 | 5/1995 |
| JP | 2008-185035 | 8/2008 |
| JP | 2009-174368 A | 8/2009 |
| JP | 2009-191778 | 8/2009 |

OTHER PUBLICATIONS

International Search Report for corresponding International Application No. PCT/JP2012/055869, Jun. 12, 2012.

Written Opinion for corresponding International Application No. PCT/JP2012/055869, Jun. 12, 2012.

* cited by examiner

PARTICULATE COLLECTION FILTER STATE DETECTION DEVICE

TECHNICAL FIELD

The present invention relates to a particulate collection filter state detection device, and is concerned with a particulate collection filter state detection device preferable for determining a state of a filter for collecting particulates contained in an exhaust gas flowing on an exhaust gas flow path based on pressures in front and back of such a filter.

BACKGROUND ART

Conventionally, a system including a particulate collection filter (DPF: diesel particulate filter) composed of a porous ceramic has been known for collecting C (carbon)-based particulates (PM) exhausted from a diesel engine. PM is gradually deposited on a DPF through continuous use of a diesel engine. PM deposited on a DPF is combusted at an appropriate timing to be oxidized and removed, so as to prevent cracking of the DPF or the like or leakage of the PM toward a downstream side of the DPF. Additionally, if regeneration of a DPF is conducted before a certain amount of PM is deposited on the DPF, degradation of fuel consumption is caused. Therefore, a DPF with PM deposited thereon is regenerated at an appropriate timing.

In order to measure an amount of PM deposited on a DPF to provide an appropriate timing of combustion of such PM, it is considered that a pressure sensor is provided on each of an upstream side exhaust gas flow path and a downstream side exhaust gas flow path for the DPF and each of a ratio of magnitudes of alternating current components of outputs of respective pressure sensors and a difference between direct current components thereof is calculated (for example, see Patent Document 1).

PRIOR ART DOCUMENTS

Patent Documents

Patent Document 1: Japanese Patent Application Publication No. 60-085214

SUMMARY OF THE INVENTION

Problems to be Solved by the Invention

However, it is considered that a measurement system described in Patent Document 1 mentioned above is not necessarily a detection device with higher precision because an error is caused in determining a state of a DPF.

The present invention is provided by taking the point(s) described above into consideration and aims to provide a particulate collection filter state detection device capable of conducting determination of a state of a filter for collecting particulates in an exhaust gas at a higher precision in both a lower flow region and a higher flow region of such an exhaust gas.

Means for Solving the Problem

The inventors actively studied a cause of an error as described above, and as a result, found out that it was exhaust pulsation of a diesel engine.

A pressure in an exhaust gas flow path greatly varies due to exhaust pulsation of a diesel engine. Herein, such a pressure includes a fundamental wave depending on a rotational frequency of an engine and includes a higher harmonic wave component with respect to such a fundamental wave. Furthermore, a phase shift (that appears as a time deviation) is caused between a pressure at a downstream side of a DPF and a pressure at an upstream side of the DPF. Because adjustment of a phase (adjusting of a time deviation) between a pressure value at an upstream side of a DPF and a pressure value at a downstream side of the DPF is not conducted in a technique described in Patent Document 1, it has been difficult to conduct determination of a state of a DPF, that is, deposition of PM thereon, at a good precision, based on both pressure values.

In order to achieve an object as described above, a particulate collection filter state detection device according to the present invention is a particulate collection filter state detection device for detecting a state of a filter for collecting particulates contained in an exhaust gas flowing on an exhaust gas flow path, including first pressure detection means for detecting a first pressure produced at an upstream side of the filter on the exhaust gas flow path, second pressure detection means for detecting a second pressure produced at a downstream side of the filter on the exhaust gas flow path, and filter state determination means for determining a state of the filter, wherein the filter state determination means are composed of an operation part and a storage part, wherein values of the first and second pressures detected by the first and second pressure detection means are stored in the storage part, wherein values of the first and second pressures detected by the first and second pressure detection means are transmitted from the storage part to the operation part, and wherein a state of the filter is determined in the operation part by using comparison means for comparing spectral intensities and/or phases at a zero frequency and spectral intensities and/or phases at a predetermined frequency obtained by first and second Fourier transformation means for applying Fourier transformation to each of values of the first and second pressures.

Also, in order to achieve an object as described above, a particulate collection filter state detection device according to the present invention is a particulate collection filter state detection device for detecting a state of a filter for collecting particulates contained in an exhaust gas flowing on an exhaust gas flow path, including first pressure detection means for detecting a first pressure produced at an upstream side of the filter on the exhaust gas flow path, second pressure detection means for detecting a second pressure produced at a downstream side of the filter on the exhaust gas flow path, first Fourier transformation means for applying Fourier transformation to a value of the first pressure detected by the first pressure detection means, second Fourier transformation means for applying Fourier transformation to a value of the second pressure detected by the second pressure detection means, comparison means for comparing a spectral intensity and/or a phase at a zero frequency and a spectral intensity and/or a phase at a predetermined frequency obtained by the first Fourier transformation means and a spectral intensity and/or a phase at a zero frequency and a spectral intensity and/or a phase at the predetermined frequency obtained by the second Fourier transformation means, and filter state determination means for determining a state of the filter based on a comparison result provided by the comparison means.

Additionally, in the particulate collection filter state detection device as described above, the comparison means may include first sum calculation means for calculating a sum of a spectral intensity and/or a phase at a zero frequency and a spectral intensity and/or a phase at the predetermined frequency obtained by the first Fourier transformation means, second sum calculation means for calculating a sum of a spectral intensity and/or a phase at a zero frequency and a spectral intensity and/or a phase at the predetermined frequency obtained by the second Fourier transformation means, and difference calculation means for calculating a difference between a sum calculated by the first sum calculation means and a sum calculated by the second sum calculation means, and the filter state determination means may determine a state of the filter based on the difference calculated by the difference calculation means.

Furthermore, in the particulate collection filter state detection device as described above, the filter state determination means may estimate a deposition amount of the particulate collected by the filter based on a comparison result provided by the comparison means.

Furthermore, the particulate collection filter state detection device as described above may include filter regeneration instruction means for instructing regeneration of the filter in a case where the deposition amount estimated by the filter state determination means reaches a predetermined amount.

Furthermore, in the particulate collection filter state detection device as described above, the filter state determination means may estimate an amount of an incombustible residue deposited on the filter, based on a change of a comparison result provided by the comparison means from an initial state of the filter to after conducting regeneration of the filter.

Furthermore, in the particulate collection filter state detection device as described above, the filter state determination means may determine or estimate an abnormality or a failure of the filter based on a time variation of a comparison result provided by the comparison means.

Furthermore, in the particulate collection filter state detection device as described above, the predetermined frequency may be a frequency depending on a rotational frequency of an internal combustion engine.

Furthermore, in the particulate collection filter state detection device as described above, the predetermined frequency may be a fundamental frequency in a rotational frequency of an internal combustion engine.

Furthermore, in the particulate collection filter state detection device as described above, the predetermined frequency may be a frequency higher than a fundamental frequency in a rotational frequency of an internal combustion engine.

Furthermore, in the particulate collection filter state detection device as described above, it is preferable that each of a period of time for detecting the first pressure by the first pressure detection means and a period of time for detecting the second pressure by the second pressure detection means is less than a period at a fundamental frequency in a rotational frequency of an internal combustion engine.

Effects of the Invention

According to the present invention, it is possible to conduct determination of a state of a filter for collecting particulates in an exhaust gas in both a lower flow region and a higher flow region of the exhaust gas at a higher precision.

EMBODIMENTS FOR IMPLEMENTING THE INVENTION

Figure 1:
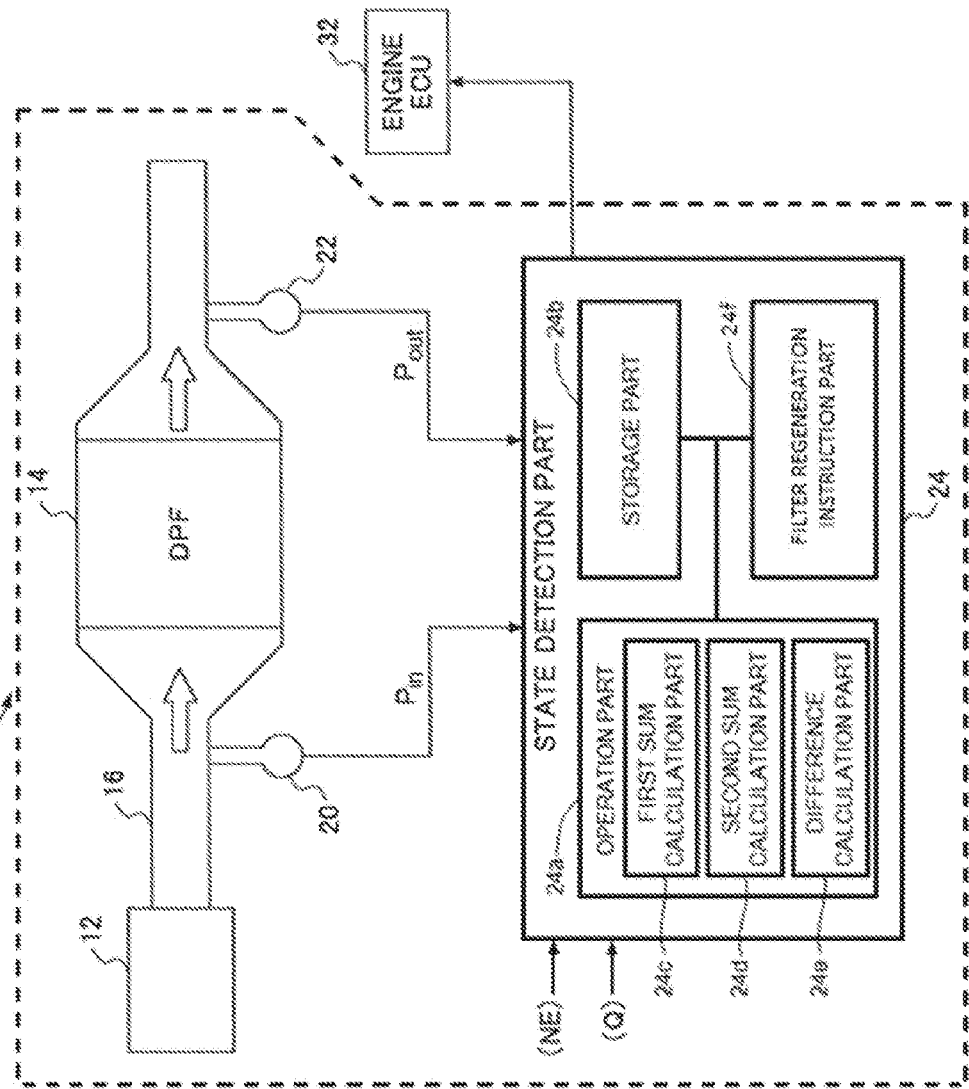
FIG. 1 is a general structural diagram of a system including a particulate collection filter state detection device that is one embodiment of the present invention.

In a method for detecting a deposition amount of particulates deposited on a DPF by a conventional device for regenerating a filter for an internal combustion engine disclosed in Patent Document 1 (Japanese Patent Application Publication No. 60-085214), there has been a problem that a lower precision of detection of a deposition amount of particulates deposited on a DPF is provided. A factor was considered for thus providing a lower precision of detection of a deposition amount of particulates. A fact was found that a pressure on an exhaust gas flow path greatly changed depending on an exhaust pulsation of a diesel engine and a phase shift (that appears as a time deviation) was produced between a pressure value at an upstream side of a DPF and a pressure value at a downstream side of the DPF. However, in the above-mentioned technique described in Patent Document 1, a problem was found that a lower precision of detection of a deposition amount of particulates was provided, because a pressure value at an upstream side of a DPF and a pressure value at a downstream side of the DPF, per se, were used to detect a deposition amount of particulates deposited on a DPF and a great influence of a phase shift (that appears as a time deviation) was received.

On the other hand, each of a pressure value at an upstream side of a DPF and a pressure value at a downstream side of the DPF is Fourier-transformed to obtain a spectral intensity at each frequency, so that it is possible to compare both pressures at the upstream side of the DPF and the downstream side of the DPF without receiving an influence of a phase shift. Furthermore, while an alternating current component of a pressure in an exhaust gas flow path is caused to decrease by a DPF, so that a spectral intensity at an identical particular frequency depending on exhaust pulsation of an engine decreases between a front and a back of the DPF, a direct current component of a pressure in the exhaust gas flow path is also caused to decrease by the DPF, so that a spectral intensity at a zero frequency decreases between a front and a back of the DPF. It was found that a relative relationship between a value based on a spectral intensity at a particular frequency and a spectral intensity at a zero frequency at an upstream side of a DPF and a value based on a spectral intensity at the particular frequency and a spectral intensity at the zero frequency at a downstream side of the DPF correlates with a deposition amount of particulates deposited on the DPF.

Then, the present invention was completed by finding an effect that each of a pressure value at an upstream side of a DPF and a pressure value at a downstream side of the DPF is Fourier-transformed to obtain a spectral intensity at each frequency and then values based on a spectral intensity at a particular frequency and a spectral intensity at a zero frequency are compared, so that it was possible to detect a deposition amount of particulates deposited on the DPF at a good precision based on such a comparison result.

Specific embodiments of a particulate collection filter state detection device according to the present invention will be described by using the drawings below.

FIG. 1 illustrates a general structural diagram of a system including a particulate collection filter state detection device 10 that is one embodiment of the present invention. A system according to the present embodiment is a system intended to detect a state (specifically, a deposition amount of PM) of a particulate collection filter (DPF: Diesel Particulate Filter) 14 for collecting particulates (PM: Particulate Matter) contained in an exhaust gas exhausted from an internal combustion engine (specifically, diesel engine) 12 and regenerate the DPF 14 in a case where such a detected deposition amount of PM reaches a predetermined amount.

As illustrated in FIG. 1, a particulate collection filter state detection device 10 includes the DPF 14 provided on an exhaust gas flow path 16 connecting to the internal combustion engine 12. The DPF 14 is a filter capable of collecting PM contained in an exhaust gas exhausted from the internal combustion engine 12. Furthermore, the particulate collection filter state detection device 10 includes a pair of pressure sensors 20 and 22 provided on the exhaust gas flow path 16. Additionally, it is desirable that the pressure sensors 20 and 22 are arranged and provided at positions on the exhaust gas flow path 16 where an influence of a dynamic pressure that changes depending on a density and a flow rate of an exhaust gas is a minimum (positions where an influence of resonance is not caused), that is, positions where it is possible to measure a static pressure that changes depending on, mainly, a pressure loss.

The pressure sensor 20 is a sensor for outputting an electric signal (voltage signal) depending on a pressure (upstream side pressure) produced at an upstream side of the DPF 14 on the exhaust gas flow path 16. Furthermore, the pressure sensor 22 is a sensor for outputting an electric signal (voltage signal) depending on a pressure (downstream side pressure) produced at a downstream side of the DPF 14 on the exhaust gas flow path 16. The pressure sensor 20 and the pressure sensor 22 will be referred to as an upstream side pressure sensor 20 and a downstream side pressure sensor 22, respectively, below. Each of the upstream side pressure sensor 20 and the downstream side pressure sensor 22 is connected to a state detection part 24 that is principally composed of a microcomputer. Each of an output signal from the upstream side pressure sensor 20 and an output signal from the downstream side pressure sensor 22 is supplied to the state detection part 24.

The state detection part 24 detects an upstream side pressure Pin produced at an upstream side of the DPF 14 based on an output signal from the upstream side pressure sensor 20 and detects a downstream side pressure Pout produced at a downstream side of the DPF 14 based on an output signal from the downstream side pressure sensor 22. Pressure detection due to such a state detection part 24 is conducted at each predetermined sampling time (for example, 500 µs), that is, a predetermined sampling frequency (for example, 2 kHz).

Additionally, the predetermined sampling time described above is less than a period at a fundamental frequency Fbase in a rotational frequency NE of the internal combustion engine 12. Furthermore, such a fundamental frequency Fbase is a frequency determined by a value of a rotational frequency NE of the internal combustion engine 12, and is a lower frequency in a case where the rotational frequency NE is smaller or a higher frequency in a case where the rotational frequency NE is larger. For example, in a case where the internal combustion engine 12 is an in-line four cylinder and four stroke engine, gas exhaustion from such an internal combustion engine 12 is provided two times per one revolution thereof and pulsation of an exhaust gas pressure is provided two times per one revolution thereof, so that pulsation of gas exhaustion of 2000/min is generated at 1000 rpm, wherein a frequency of pulsation depending on a rotational frequency NE of an engine is 33.3 Hz and a fundamental frequency Fbase thereof is 33.3 Hz. Additionally, it is preferable for the predetermined sampling time described above to be less than a period (10 ms) at a fundamental frequency Fbase that is an upper limit for conducting pressure detection in a rotational frequency NE of the internal combustion engine 12 (for example, 100 Hz when an upper limit for conducting pressure detection in a rotational frequency of the internal combustion engine 12 that is an in-line four cylinder and four stroke engine is 3000 rpm). As will be described in detail below, the state detection part 24 executes arithmetic processing of the above-mentioned detected upstream side pressure Pin and downstream side pressure Pout and calculation of a deposition amount M of PM deposited on the DPF 14.

Furthermore, each of a signal indicating a rotational frequency NE of the internal combustion engine 12 and a signal indicating an amount of exhaust air Q of the internal combustion engine 12 is supplied to the state detection part 24. The state detection part 24 detects the rotational frequency NE and the amount of exhaust air Q of the internal combustion engine 12. Additionally, a time deviation is produced between a rotational frequency NE and a pressure waveform, so that it is preferable to correct and use such a shift.

A system in the present practical example also includes an electrical control unit for an engine (that will be referred to as an engine ECU, below) 32 for executing each kind of control of the internal combustion engine 12. The state detection part 24 described above is connected to the engine ECU 32. The state detection part 24 determines whether or not a calculated deposition amount M of PM on the DPF 14 reaches a predetermined amount, and as a result of such determination, supplies an instruction for regenerating the DPF 14 to the engine ECU 32 in a case where a deposition amount M of PM reaches a predetermined amount. As the engine ECU 32 receives an instruction for regenerating the DPF 14 from the state detection part 24, a process for regenerating the DPF 32 (for example, a process for accelerating combustion in the internal combustion engine 12 to heat the DPF 32) is conducted.

Next, a detection process in the particulate collection filter state detection device 10 according to the present embodiment will be described with reference to FIG. 2-FIG. 6.

Figure 2:
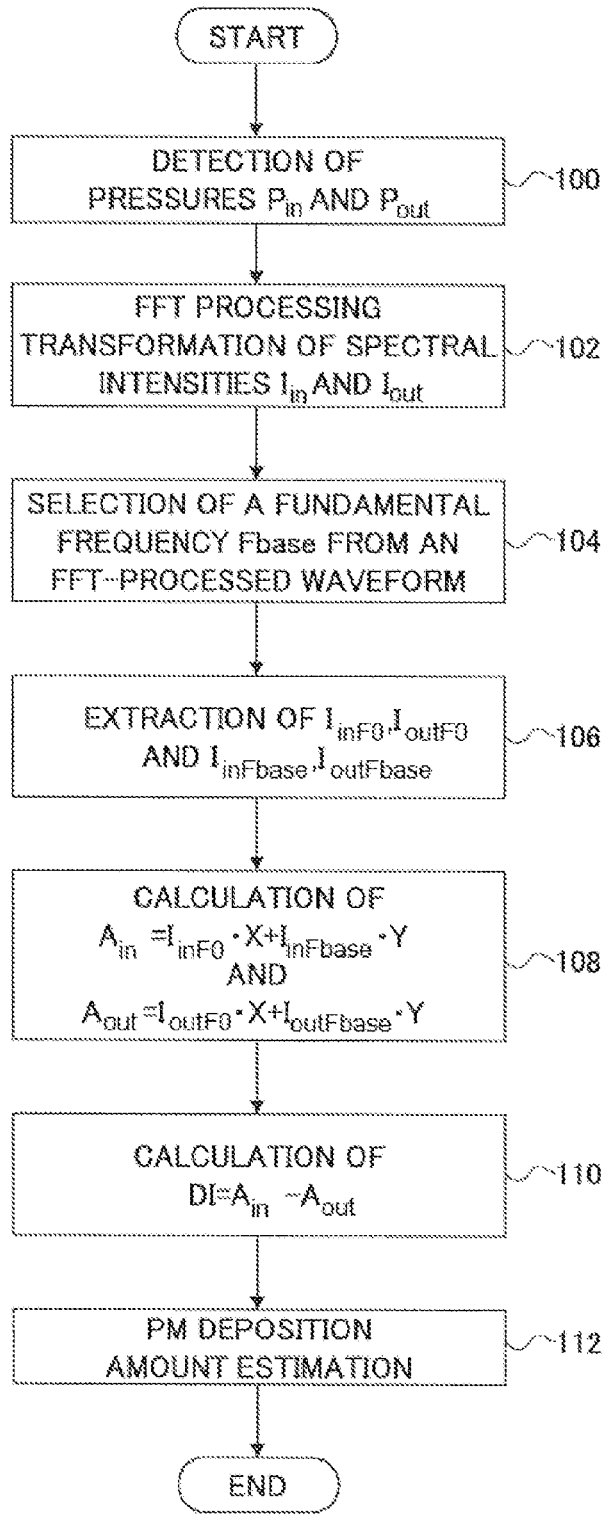
FIG. 2 is a flowchart of one example of a control routine to be executed in a particulate collection filter state detection device that is one embodiment of the present invention.

FIG. 2 is a flowchart illustrating one example of a control routine to be executed by the state detection part 24 in the particulate collection filter state detection device 10 that is one embodiment of the present invention. FIG. 3(A) illustrates a waveform diagram representing time series data of pressure values Pin and Pout in front and back of a DPF before the state detection part 24 in the particulate collection filter state detection device 10 that is one embodiment of the present invention applies an FFT (Fast Fourier Transform) process thereto. FIG. 3(B) illustrates a waveform diagram representing frequency data of a spectral intensity after the state detection part 24 in the particulate collection filter state detection device 10 that is one embodiment of the present invention applies an FFT process to each of pressure values Pin and Pout as illustrated in FIG. 3(A).

Figure 4:
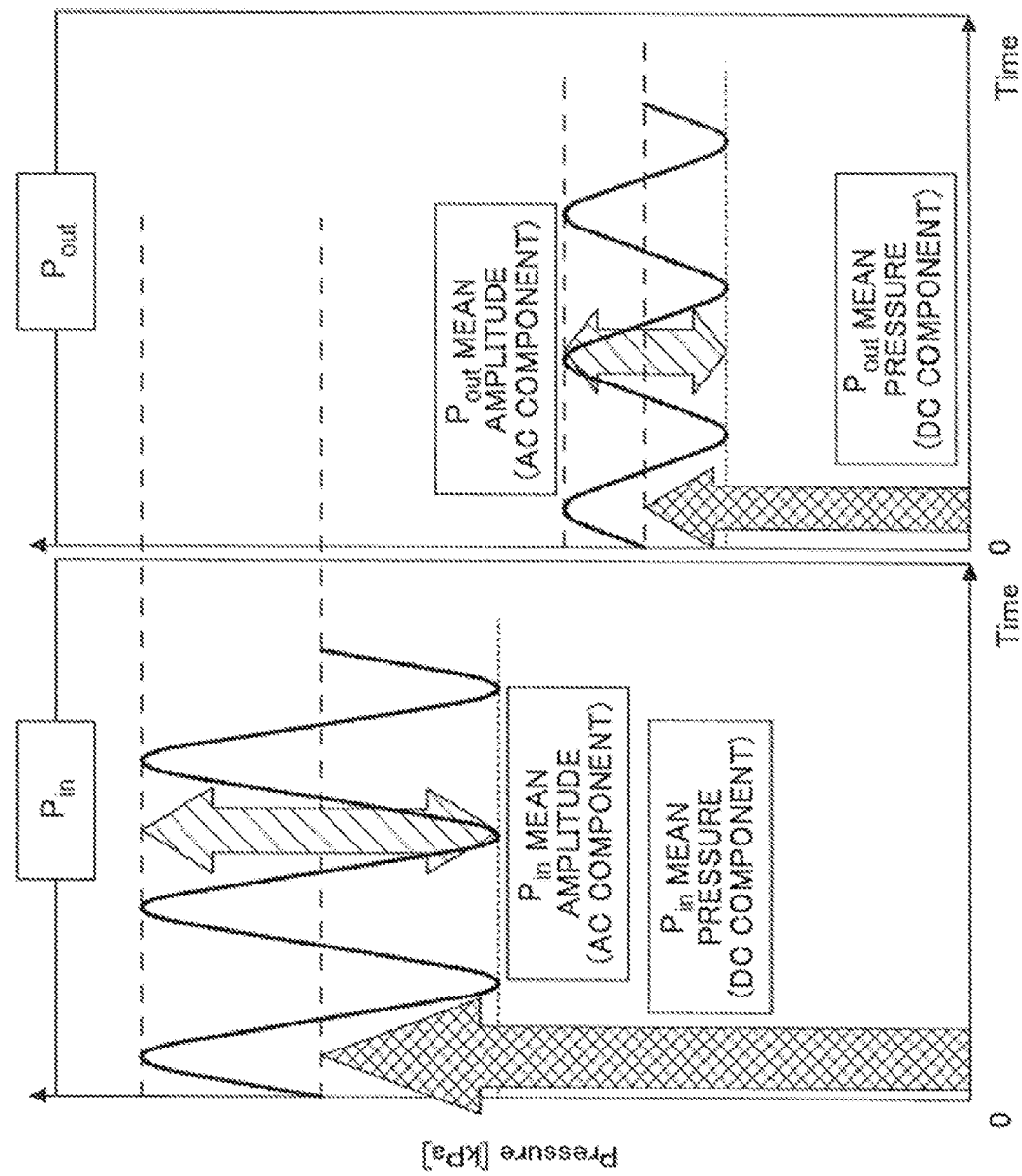
FIG. 4 is a diagram for comparing pressure waveforms in front and back of a filter.
Figure 5:
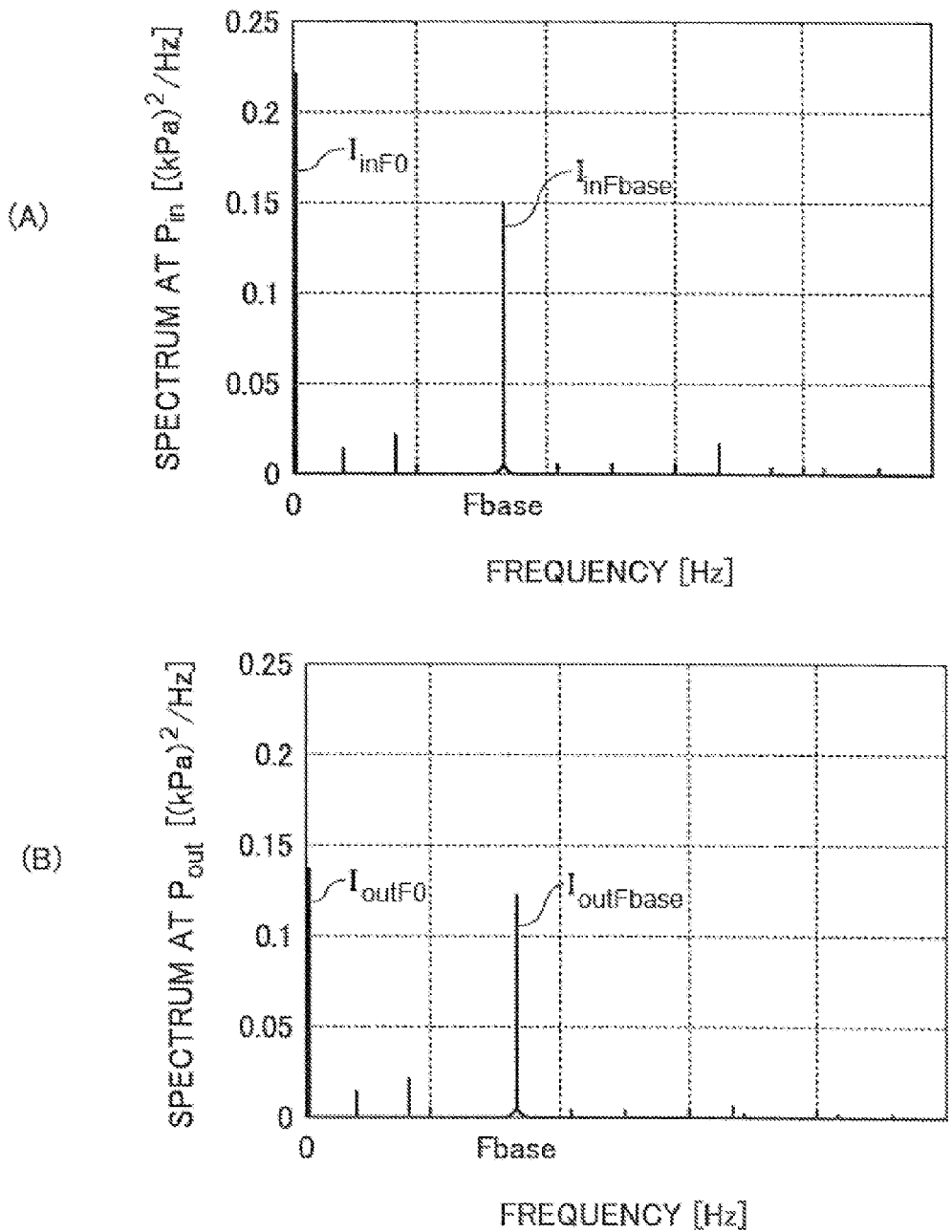
FIG. 5 is a waveform diagram representing a spectral intensity after FFT processing with respect to each of a pressure at an upstream side of a filter and a pressure at a downstream side of the filter in a particulate collection filter state detection device that is one embodiment of the present invention.
Figure 6:
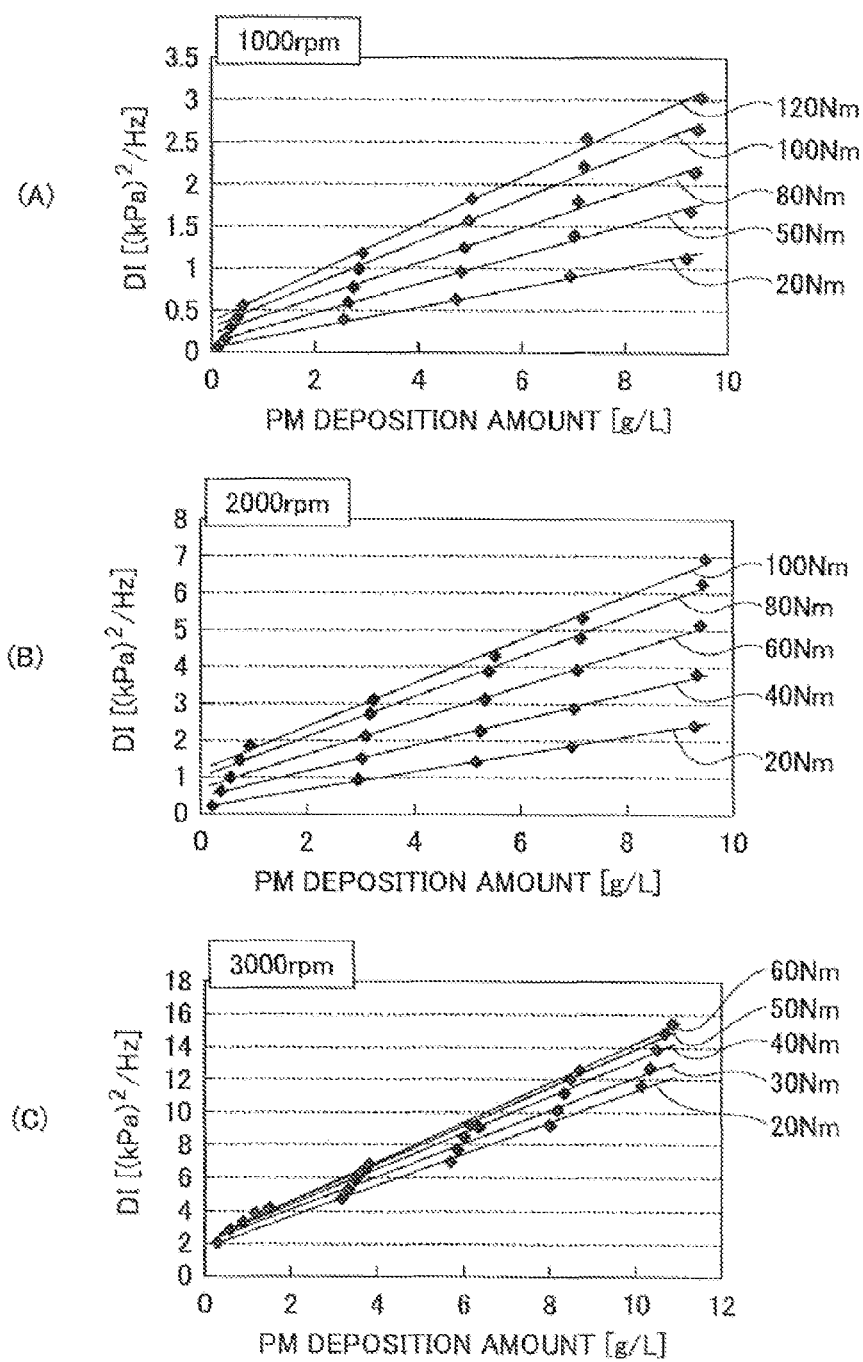
FIG. 6 is a diagram illustrating an effect provided by a particulate collection filter state detection device that is one embodiment of the present invention.

FIG. 4 illustrates a diagram for comparing pressure waveforms in front and back of a filter. FIG. 5(A) illustrates a waveform diagram representing a spectral intensity after an FFT process of a pressure value Pin at an upstream side of a DPF in the particulate collection filter state detection device 10 that is one embodiment of the present invention. FIG. 5(B) illustrates a waveform diagram representing a spectral intensity after an FFT process of a pressure value Pout at a downstream side of a DPF in the particulate collection filter state detection device 10 that is one embodiment of the present invention. Furthermore, FIG. 6 is a diagram for illustrating an effect provided by the particulate collection filter state detection device 10 that is one embodiment of the present invention. Additionally, FIG. 6 illustrates one example of a relationship between a DPF front and back difference DI of a sum of a spectral intensity at a zero frequency F0 and a spectral intensity at a fundamental frequency Fbase after an FFT process of each of pressure values Pin and Pout in front and back of a DPF and a deposition amount of PM deposited on a filter, with respect to each rotational frequency and each torque of the internal combustion engine 12.

In the present embodiment, the state detection part 24 detects an upstream side pressure Pin [kPa] produced at an upstream side of the DPF 14 based on an output signal from the upstream side pressure sensor 20 and detects a downstream side pressure Pout [kPa] produced at a downstream side of the DPF 14 based on an output signal from the downstream side pressure sensor 22, at each predetermined sampling time (step 100). Then, each of data of an upstream side pressure value Pin and a downstream side pressure Pout is stored in a memory during a predetermined time (for example, 10 seconds or the like).

Figure 3:
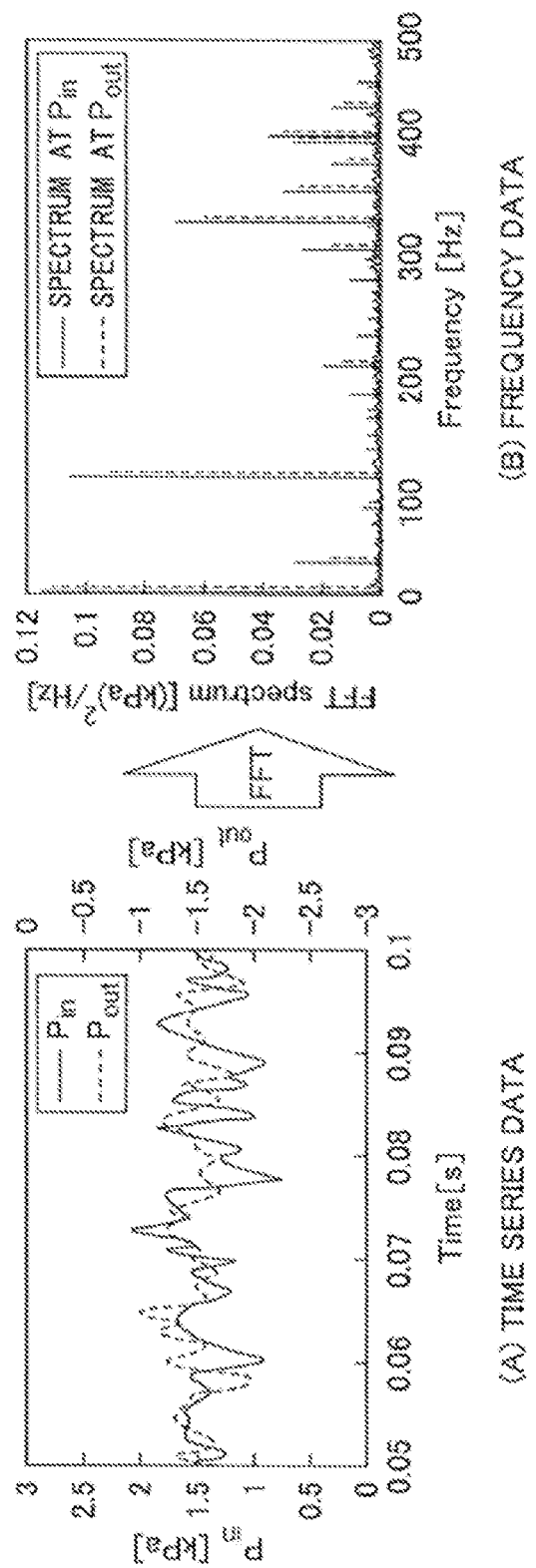
FIG. 3 is a waveform diagram representing time series data of pressure values before and after FFT processing in a particulate collection filter state detection device that is one embodiment of the present invention.

The state detection part 24 applies an FFT process to an upstream side pressure value Pin during a predetermined time stored as described above to transform such an upstream side pressure value Pin into a spectral intensity Iin [(kPa)$^2$/Hz] for each frequency and applies an FFT process to a downstream side pressure value Pout during a predetermined time stored as described above to transform such a downstream side pressure value Pout into a spectral intensity Iout [(kPa)$^2$/Hz] for each frequency (step 102; see FIG. 3). As such transformation is executed, each of an upstream side pressure value Pin and a downstream side pressure value Pout where pulsation depending on a rotational frequency NE of an engine is caused is separated into a phase and a component thereof.

The state detection part 24 detects and selects a fundamental frequency Fbase from a spectral intensity after an FFT process as described above (step 104). Specifically, a fundamental frequency Fbase is provided as a frequency where a spectral intensity among spectral intensities at respective frequencies after an FFT process is a maximum value. Additionally, a fundamental frequency Fbase is uniquely determined depending on a rotational frequency NE of the internal combustion engine 12 and a kind of such an internal combustion engine 12. A fundamental frequency Fbase is a lower frequency for a lower rotational frequency NE or a higher frequency for a higher rotational frequency NE.

Furthermore, as another method for obtaining a fundamental frequency Fbase, (1) a fundamental frequency Fbase may be provided as a frequency that is four times as high as a lowest frequency where a predetermined or greater spectral intensity among spectral intensities after an FFT process appears when the internal combustion engine 12 is an in-line four cylinder and four stroke engine or (2) based on a detected rotational frequency NE of the internal combustion engine 12, a fundamental frequency Fbase of pulsation depending on such a rotational frequency NE may be obtained. In such a case, when the internal combustion engine 12 is an in-line four cylinder and four stroke engine and a rotational frequency NE is 2000 rpm, a fundamental frequency Fbase is set at 66.67 Hz.

The state detection part 24 calculates respective spectral intensities Iin and Iout and a fundamental frequency Fbase after an FFT process as described above, then extracts spectral intensities $Iin_{F0}$ and $Iout_{F0}$ at a zero frequency F0 where a frequency is zero, and extracts spectral intensities $Iin_{Fbase}$ and $Iout_{Fbase}$ at such a calculated fundamental frequency Fbase (step 106). Then, a deposition amount M [g/l] of PM deposited on the DPF 14 is estimated based on such spectral intensities $Iin_{F0}$ and $Iin_{Fbase}$ for an upstream side pressure value Pin and spectral intensities $Iout_{F0}$ and $Iout_{Fbase}$ for a downstream side pressure value Pout.

Specifically, for estimating a deposition amount M [g/l] of PM on the DPF 14, the state detection part 24, first, calculates a sum (that will be referred to as a first spectral sum, below) Ain of a value that is X times a spectral intensity $Iin_{F0}$ at a zero frequency F0 and a value that is Y times a spectral intensity $Iin_{Fbase}$ at a fundamental frequency Fbase for an upstream side pressure value Pin in accordance with the following formula (1) and calculates a sum (that will be referred to as a second spectral sum, below) Aout of a value that is X times spectral intensity $Iout_{F0}$ at a zero frequency F0 and a value that is Y times a spectral intensity $Iout_{Fbase}$ at a fundamental frequency Fbase for a downstream side pressure value Pout in accordance with the following formula (2) (step 108).

$$A\text{in}=I\text{in}_{F0}\cdot X+I\text{in}_{Fbase}\cdot Y \quad (1)$$

$$A\text{out}=I\text{out}_{F0}\cdot X+I\text{out}_{Fbase}\cdot Y \quad (2)$$

Additionally, the above-mentioned value X is a coefficient to be multiplied by a spectral intensity at a zero frequency F0 for calculating the above-mentioned spectral sums Ain and Aout. Furthermore, the above-mentioned value Y is a coefficient to be multiplied by a spectral intensity at a fundamental frequency Fbase for calculating the above-mentioned spectral sums Ain and Aout. Such values X and Y are preliminarily fixed values so as to provide a predetermined ratio, and for example, are both set at "1".

The state detection part 24 calculates a difference DI (=Ain−Aout) between a first spectral sum Ain and a second spectral sum Aout calculated as described above (step 110). Then, a deposition amount M [g/l] of PM deposited on the DPF 14 is estimated based on a magnitude of such a DI (step 112).

A difference DI between a first spectral sum Ain for an upstream side pressure value Pin and a second spectral sum Aout for a downstream side pressure value Pout proportionally or linearly changes depending on a deposition amount of PM on the DPF 14 and is smaller for a smaller deposition amount thereof or larger for a larger deposition amount thereof.

The state detection part 24 preliminarily stores a relationship between a deposition amount of PM on the DPF 14 and the above-mentioned DI for frequency spectra at pressures in front and back of such a DPF. Additionally, it is preferable that such a relationship between a deposition amount and a difference DI has been set depending on a rotational frequency NE or a torque of the internal combustion engine 12. At step 112 mentioned above, the state detection part 24 refers to a stored relationship between a deposition amount of PM and the above-mentioned difference DI and estimates a deposition amount M of PM deposited on the DPF 14 based on a difference DI between a first spectral sum Ain and a second spectral sum Aout calculated at step 110 mentioned above and further by referring to a rotational frequency NE or a torque of the internal combustion engine 12.

Additionally, the state detection part 24 may apply a correction depending on an initial pressure loss ΔP or an amount of exhaust air of the DPF 14 (that, additionally, may be an average value during a predetermined time for storing data of pressures Pin and Pout) for estimating a deposition amount M of PM on the DPF 14. For example, a relationship between spectral intensities $\text{Iin}_{Fbase}$ and $\text{Iout}_{Fbase}$ changes depending on a magnitude of a pressure loss ΔP even at an identical rotational frequency NE, that is, an identical fundamental frequency Fbase, specifically, $\text{Iout}_{Fbase}$ is smaller for a larger pressure loss ΔP, so that, for example, $\text{Iout}_{Fbase}$ may be corrected to be a smaller value for a larger pressure loss ΔP in order to estimate a deposition amount M of PM based on spectral intensities $\text{Iin}_{F0}$ and $\text{Iout}_{F0}$ at a zero frequency F0 and spectral intensities $\text{Iin}_{Fbase}$, and $\text{Iout}_{Fbase}$ at fundamental frequency Fbase.

Thus, in the particulate collection filter state detection device 10 according to the present practical example, each of an upstream side pressure Pin and a downstream side pressure Pout in front and back of the DPF 14 is sampled during each predetermined sampling time, an FFT process is applied to data of such pressure values Pin and Pout, a DPF front and back difference DI of a sum of a spectral intensity at a zero frequency F0 and a spectral intensity at a fundamental frequency Fbase is calculated based on spectral intensities $\text{Iin}_{F0}$ and $\text{Iout}_{F0}$ at a fundamental frequency F0 and spectral intensities $\text{Iin}_{Fbase}$ and $\text{Iout}_{Fbase}$ at a fundamental frequency Fbase depending on a rotational frequency NE of the internal combustion engine 12, and a deposition amount M of PM deposited on the DPF 14 is estimated based on such a calculated DPF front and back different DI.

A pressure difference ΔP (=Pin−Pout) between an upstream side and a downstream side of the DPF 14 is produced by an exhaust gas passing through the DPF 14. Such a pressure difference ΔP is a pressure loss due to presence of the DPF 14 and changes depending on a gas flow rate, a low velocity, temperature, or the like. Furthermore, a pressure of an exhaust gas greatly varies due to exhaust pulsation of the internal combustion engine 12 and includes a component of a fundamental frequency Fbase depending on a rotational frequency NE of the internal combustion engine 12 and a higher harmonic wave component for such a fundamental frequency Fbase. An amplitude of an alternating current component of a pressure due to pulsation decreases and a direct current component of a pressure that is a time average value decreases between a front and a back of the DPF 14 in a process for passing an exhaust gas through the DPF 14. Accordingly, a spectral intensity at a zero frequency F0 decreases and a spectral intensity at a fundamental frequency Fbase or a higher harmonic wave thereof decreases between a front and a back of the DPF 14.

Each of such a decreasing rate of a spectral intensity at a zero frequency F0 and a decreasing rate of a spectral intensity at a fundamental frequency Fbase changes depending on a deposition amount of PM on the DPF 14 and a DPF front and back decreasing rate of a sum of a spectral intensity at a zero frequency F0 and a spectral intensity at a fundamental frequency Fbase increases for a larger deposition amount of PM on the DPF 14. That is, a sum (second spectral sum Aout) of spectral intensities at a zero frequency F0 and a fundamental frequency Fbase at a downstream side of the DPF 14 relative to a sum (first spectral sum Ain) of spectral intensities at a zero frequency F0 and a fundamental frequency Fbase at a upstream side of the DPF 14 decreases for a larger deposition amount of PM.

Therefore, in the particulate collection filter state detection device 10 according to the present practical example, spectral intensities Iin and Iout obtained by FFT-processing respective pressure values Pin and Pout in a front and a back of the DPF 14 are used for estimating a deposition amount of PM on the DPF 14 for collecting PM in an exhaust gas, so that it is possible to eliminate a phase shift between pressures in a front and a back of the DPF 14 that appears as a time deviation and accordingly it is possible to estimate a deposition amount of PM on the DPF 14 for collecting PM in an exhaust gas at a good precision.

Furthermore, a DPF front and back difference that is a value wherein an alternating current component and a direct current component of each of pressures in front and back of a DPF are taken into consideration (specifically, a difference DI between a sum (first spectral sum Ain) of a spectral intensity $\text{Iin}_{F0}$ at a zero frequency F0 and a spectral intensity $\text{Iin}_{Fbase}$ at a fundamental frequency Fbase for an upstream side of the DPF 14 and a sum (second spectral sum Aout) of a spectral intensity $\text{Iout}_{F0}$ at a zero frequency F0 and a spectral intensity $\text{Iout}_{Fbase}$ at a fundamental frequency Fbase for a downstream side of the DPF 14) is used for estimating a deposition amount of PM on the DPF 14 for collecting PM in an exhaust gas in the present practical example.

In such a configuration, a deposition amount of PM is estimated from a difference between spectral intensities in front and back of a DPF by also including a direct current component of a pressure, so that it is possible to estimate a deposition amount of PM on the DPF 14 for collecting PM in an exhaust gas at a good precision both at a time of higher rotation of the internal combustion engine 12, that is, a time of a higher flow velocity of an exhaust gas, and at a time of lower rotation of the internal combustion engine 12, that is, a time of a lower flow velocity of an exhaust gas, and it is possible to estimate a deposition amount of PM on the DPF 14 for collecting PM in an exhaust gas at a good precision both at a time of a higher torque and a time of a lower torque of the internal combustion engine 12, as illustrated in FIG. 6. That is, it is possible to estimate a deposition amount of PM on the DPF 14 at a good precision independently of a rotational frequency or a magnitude of a torque of the internal combustion engine 12.

In a system according to the present practical example, the state detection part 24 estimates a deposition amount M of PM on the DPF 14 as described above, and then, determines whether or not such a deposition amount M of PM reaches a predetermined amount. Additionally, such a predetermined amount is a lower limit value of a value capable of causing leakage of PM from the DPF 14 to a downstream side thereof and is preliminarily provided. In a case where the state detection part 24 determines that an estimated deposition amount M of PM reaches a predetermined amount, an instruction for regenerating the DPF 14 is provided to the engine ECU 32. As such a process is conducted, the DPF 14 is heated, so that such PM deposited on the DPF 14 is combusted and removed. Therefore, it is possible for a system according to the present practical example to conduct regeneration of the DPF 14 with PM deposited thereon at a good timing just before a maximum collection amount of PM is deposited on the DPF 14 (additionally, such a maximum collection amount is an amount where a crack is not produced on the DPF 14 at time of combustion of PM) and it is possible to facilitate repeated utilization of the DPF 14.

Furthermore, it is possible to obtain more detailed information such as a fine crack or a change of a trace amount of PM on the DPF 14 by comparing phase waveforms after an FFT process for an upstream side pressure value Pin and a downstream side pressure value Pout on the DPF 14. A phase has a peak at a frequency that is an identical to a peak frequency of a spectral intensity and changes between an upstream side and a downstream side of the DPF 14. Whereas a spectral intensity decreases from an upstream side to a downstream side of the DPF 14, a phase may increase, so that it is possible to estimate a state of the DPF 14 from a decreasing rate or an increasing rate of a phase.

Meanwhile, in the above-mentioned embodiment, the DPF 14 corresponds to a "filter" recited in the claims. Furthermore, the state detection part 24 detecting an upstream side pressure Pin produced at an upstream side of the DPF 14 based on an output signal from the upstream side pressure sensor 20, detecting a downstream side pressure Pout produced at a downstream side of the DPF 14 based on an output signal from the downstream side pressure sensor 22, applying an FFT process to an upstream side pressure value Pin, applying an FFT process to a downstream side pressure value Pout, and comparing a spectral intensity $\text{Iin}_{F0}$ at a zero frequency F0 and a spectral intensity $\text{Iin}_{Fbase}$ at a fundamental frequency Fbase after an FFT process for an upstream side pressure value Pin and a spectral intensity $\text{Iout}_{F0}$ at a zero frequency F0 and a spectral intensity $\text{Iout}_{Fbase}$ at a fundamental frequency Fbase after an FFT process for a downstream side pressure value Pout realize "first pressure detection part" recited in the claims, "second pressure detection part" recited in the claims, "first Fourier transformation part" recited in the claims, "second Fourier transformation part" recited in the claims, and "comparison part" recited in the claims, respectively.

Furthermore, in the above-mentioned embodiment, the state detection part 24 calculating a sum (first spectral sum Ain) of a spectral intensity $\text{Iin}_{F0}$ at a zero frequency F0 and a spectral intensity $\text{Iin}_{Fbase}$ at a fundamental frequency Fbase after an FFT process for an upstream side pressure value Pin, calculating a sum (second spectral sum Aout) of a spectral intensity $\text{Iout}_{F0}$ at a zero frequency F0 and a spectral intensity $\text{Iout}_{Fbase}$ at a fundamental frequency Fbase after an FFT process for a downstream side pressure value Pout, and calculating a difference DI between the above-mentioned first spectral sum Ain and the above-mentioned second spectral sum Aunt realize "first sum calculation part" recited in the claims, "second sum calculation part" recited in the claims, and "difference calculation part" recited in the claims, respectively. For example, FIG. 1 shows the state detection part 24 as the filter state determination part configured to include an operation pan 24a and a storage part 24b, where the operation pan 24a is further configured to include a first sum calculation part 24c, a second sum calculation part 24d, and a difference calculation part 24e.

Furthermore, in the above-mentioned embodiment the state detection part 24 estimating a deposition amount M of PM deposited on the DPF 14 based on the above-mentioned difference DI and providing an instruction of regeneration of the DPF 14 to the engine ECU 32 for heating the DPF 14 in a case where determination is provided in such a manner that a deposition amount M of PM reaches a predetermined amount realize "filter state determination part" recited in the claims and "filter regeneration instruction part" (see, e.g., filter regeneration instruction part 24f shown in FIG. 1) recited in the claims, respectively.

Although preferred embodiments of the present invention have been described above, the present invention is not limited to such particular embodiments and it is possible to provide various variations or modifications within the essence recited in the claims.

For example, although a deposition amount of PM deposited on the DPF 14 is estimated based on a DPF front and back difference DI of a sum of a spectral intensity at a zero frequency F0 and a spectral intensity at a fundamental frequency Fbase after an FFT process for each of pressure values Pin and Pout in a front and a back of the DPF 14 in the above-mentioned embodiment, the present invention is not limited thereto, and an amount of an incombustible residue that is composed of a metal deposited on the DPF 14 (that is, a deposition amount of Ash) may be estimated based on such a DPF front and back difference DI.

That is, although an incombustible residue is not deposited at an initial state of the DPF 14 (such as just after manufacturing thereof), such an incombustible residue is gradually deposited on the DPF 14 when use of the DPF 14 is continued. Such an incombustible reside is not removed even when the DPF 14 is regenerated by heating. Furthermore, the above-mentioned DPF front and back difference DI greatly changes depending on whether an incombustible residue is deposited or not deposited on the DPF 14. Therefore, while a DPF front and back difference DI of a sum of the above-mentioned first spectral sum Ain and the above-mentioned second spectral sum A out based on spectral intensities at a zero frequency F0 and a fundamental frequency Fbase after an FFT process for each of pressure values Pin and Pout is stored at an initial state of the DPF 14, a DPF front and back difference DI of a sum of the above-mentioned first spectral sum Ain and the above-mentioned second spectral sum Aout based on spectral intensities at a zero frequency F0 and a fundamental frequency Fbase after an FFT process for each of pressure values Pin and Pout is calculated after regeneration of the DPF 14 is conducted, so that it is possible to estimate an amount of an incombustible residue deposited on the DPF 14 based on a change of such a DPF front and back difference DI from an initial state of the DPF 14 to after regeneration of the DPF 14 is conducted. For example, when an amount of a change of the above-mentioned DPF front and back difference DI from an initial state of the DPF 14 to after regeneration thereof is conducted is larger, it is possible to determine that an amount of an incombustible residue deposited on the DPF 14 is larger.

Additionally, the above-mentioned estimation of an amount of an incombustible residue on the DPF 14 may be conducted just after a deposition amount M of PM deposited on the DPF 14 reaches a predetermined amount in the above-mentioned embodiment and accordingly such a DPF 14 is heated and regenerated. Furthermore, a method different from the above-mentioned embodiment may be conducted just after the DPF 14 is regenerated.

Furthermore, although a deposition amount of PM deposited on the DPF 14 is estimated based on a DPF front and back difference DI of a sum of the above-mentioned first spectrum sum Ain and the above-mentioned spectrum sum Aout based on spectral intensities at a zero frequency F0 and a fundamental frequency Fbase after an FFT process for each of pressure values Pin and Pout in a front and a back of the DPF 14 in the above-mentioned embodiment, the present invention is not limited thereto, and an abnormality or a failure of the DPF 14 may be determined or estimated based on such a DPF front and back difference DI.

That is, the above-mentioned DPF front and back difference DI changes (decreases) with deposition of PM or incombustible residue on such a DPF 14 or the like within a predetermined range when the DPF 14 is at a normal state, and on the other hand, changes to deviate from the above-mentioned predetermined range if an abnormality or a failure is caused on the DPF 14. Therefore, it is possible to determine or estimate an abnormality or a failure on the DPF 14 based on a change of a DPF front and back difference DI of a sum of the above-mentioned first spectrum sum Ain and the above-mentioned second spectrum sum Aout based on spectral intensities at a zero frequency F0 and a fundamental frequency Fbase after an FFT process for each of pressure values Pin and Pout in front and back of the DPF 14. For example, when such a DPF front and back difference DI changes to deviate from a predefined or predetermined range, it is possible to determine or estimate that an abnormality or a failure is caused on the DPF 14. Additionally, when it is determined or estimated that an abnormality or a failure is caused on the DPF 14, an alert may be provided by an alarm, blinking on or off of a lamp, lighting, or the like in order to cause a vehicle driver, a user, or an operator to know of such an abnormality or a failure.

Furthermore, although an instruction for regenerating the DPF 14 is provided from the state detection part 24 to the engine ECU 32 so as to regenerate the DPF 14 in the above-mentioned embodiment, the present invention is not limited thereto, and heating and regeneration of the DPF 14 may be attained by providing a heater inside or around the DPF 14 and supplying electric power from the state detection part 24 to such a heater.

Moreover, although a DPF front and back difference DI of a sum of the above-mentioned first spectrum sum in and the above-mentioned second spectrum sum Aout based on spectral intensities at a zero frequency F0 and a fundamental frequency Fbase after an FFT process for each of pressure values Pin and Pout in a front and back of the DPF 14 is used to determine a state of the DPF 14 in the above-mentioned embodiment or variation example, determination of a state of the DPF 14 may be conducted by using a spectral intensity at a particular frequency F that is a higher harmonic wave and is higher than such a fundamental frequency Fbase instead of a spectral intensity at a fundamental frequency Fbase depending on a rotational frequency NE of the internal combustion engine 12 and calculating a DPF front and back difference DI of a sum of a first spectrum sum Ain and a second spectral sum Aout based on spectral intensities at a zero frequency F0 and such a particular frequency F after an FFT process for each of pressure values Pin and Pout in a front and a back of the DPF 14.

EXPLANATION OF LETTERS OR NUMERALS

10: a particulate collection filter state detection device
12: an internal combustion engine
14: a DPF
16: an exhaust gas flow path
20: an upstream side pressure sensor
22: a downstream side pressure sensor
24: a state detection part
32: an engine ECU

The invention claimed is:

1. A filter state detection device, comprising:
a first pressure detection part configured to detect a first pressure at an upstream side of a filter on an exhaust gas flow path;
a second pressure detection part configured to detect a second pressure at a downstream side of the filter on the exhaust gas flow path; and
a filter state determination part configured to include an operation part and a storage part, the storage part being configured to store values of the first and second pressures and transmit the values of the first and second pressures to the operation part, the operation part being configured to apply Fourier transformation to each of the values of the first and second pressures to obtain first and second spectral intensities and/or phases at a zero frequency and first and second spectral intensities and/or phases at a predetermined frequency and configured to compare the first spectral intensity and/or phase at a zero frequency and the first spectral intensity and/or phase at the predetermined frequency as a first group against the second spectral intensity and/or phase at a zero frequency and the second spectral intensity and/or phase at the predetermined frequency as a second group to determine a state of the filter,
wherein the operation part is further configured to include a first sum calculation part configured to calculate a first sum of the first spectral intensity and/or phase at a zero frequency and the first spectral intensity and/or phase at the predetermined frequency, a second sum calculation part configured to calculate a second sum of the second spectral intensity and/or phase at a zero frequency and the second spectral intensity and/or phase at the predetermined frequency, and a difference calculation part configured to calculate a difference between the first sum and the second sum, and wherein the filter state determination part is further configured to determine a state of the filter based on the difference.

2. The filter state detection device as claimed in claim 1, wherein the filter state determination part is further configured to estimate an amount of particulates deposited on the filter based on a result provided by comparing the first spectral intensity and/or phase at a zero frequency and the first spectral intensity and/or phase at the predetermined frequency as the first group against the second spectral intensity and/or phase at a zero frequency and the second spectral intensity and/or phase at the predetermined frequency as the second group.

3. The filter state detection device as claimed in claim 2, further comprising a filter regeneration instruction part configured to instruct regeneration of the filter in a case where the amount of particulates reaches a predetermined amount.

4. The filter state detection device as claimed in claim 1, wherein the filter state determination part is further configured to estimate an amount of an incombustible residue deposited on the filter based on a change of a result provided by comparing the first spectral intensity and/or phase at a zero frequency and the first spectral intensity and/or phase at the predetermined frequency as the first group against the second spectral intensity and/or phase at a zero frequency and the second spectral intensity and/or phase at the predetermined frequency as the second group.

5. The filter state detection device as claimed in claim 1, wherein the filter state determination part is further configured to determine or estimate an abnormality or a failure of the filter based on a time variation of a result provided by comparing the first spectral intensity and/or phase at a zero frequency and the first spectral intensity and/or phase at the predetermined frequency as the first group against the second spectral intensity and/or phase at a zero frequency and the second spectral intensity and/or phase at the predetermined frequency as the second group.

6. The filter state detection device as claimed in claim 1, wherein the predetermined frequency depends on a rotational frequency of an internal combustion engine.

7. The filter state detection device as claimed in claim 6, wherein the predetermined frequency is a fundamental frequency in the rotational frequency of the internal combustion engine.

8. The filter state detection device as claimed in claim 6, wherein the predetermined frequency is higher than a fundamental frequency in the rotational frequency of the internal combustion engine.

9. The filter state detection device as claimed in claim 1, wherein each of a period of time for detecting the first pressure and a period of time for detecting the second pressure is less than a period of time at a fundamental frequency in a rotational frequency of an internal combustion engine.

10. A particulate collection filter state detection device, comprising:
a first pressure detection part configured to detect a first pressure at an upstream side of a filter on an exhaust gas flow path;
a second pressure detection part configured to detect a second pressure at a downstream side of the filter on the exhaust gas flow path;
a first Fourier transformation part configured to apply Fourier transformation to a value of the first pressure to obtain a first spectral intensity and/or phase at a zero frequency and a first spectral intensity and/or phase at a predetermined frequency;
a second Fourier transformation part configured to apply Fourier transformation to a value of the second pressure to obtain a second spectral intensity and/or phase at a zero frequency and a second spectral intensity and/or phase at the predetermined frequency;
a comparison part configured to compare the first spectral intensity and/or phase at a zero frequency and the first spectral intensity and/or phase at the predetermined frequency as a first group against the second spectral intensity and/or phase at a zero frequency and the second spectral intensity and/or phase at the predetermined frequency as a second group to provide a comparison result; and
a filter state determination part configured to determine a state of the filter based on the comparison result,
wherein the comparison part is further configured to include a first sum calculation part configured to calculate a first sum of the first spectral intensity and/or phase at a zero frequency and the first spectral intensity and/or phase at the predetermined frequency, a second sum calculation part configured to calculate a second sum of the second spectral intensity and/or phase at a zero frequency and the second spectral intensity and/or phase at the predetermined frequency, and a difference calculation part configured to calculate a difference between the first sum and the second sum, and wherein the filter state determination part is further configured to determine a state of the filter based on the difference.

11. The filter state detection device as claimed in claim 10, wherein the filter state determination part is further configured to estimate an amount of particulates deposited on the filter based on the comparison result.

12. The filter state detection device as claimed in claim 11, further comprising a filter regeneration instruction part configured to instruct regeneration of the filter in a case where the amount of particulates reaches a predetermined amount.

13. The filter state detection device as claimed in claim 10, wherein the filter state determination part is further configured to estimate an amount of an incombustible residue deposited on the filter based on a change of the comparison result.

14. The filter state detection device as claimed in claim 10, wherein the filter state determination part is further configured to determine or estimate an abnormality or a failure of the filter based on a time variation of the comparison result.

15. The filter state detection device as claimed in claim 10, wherein the predetermined frequency depends on a rotational frequency of an internal combustion engine.

16. The filter state detection device as claimed in claim 15, wherein the predetermined frequency is a fundamental frequency in the rotational frequency of the internal combustion engine.

17. The filter state detection device as claimed in claim 15, wherein the predetermined frequency is higher than a fundamental frequency in the rotational frequency of the internal combustion engine.

18. The filter state detection device as claimed in claim 10, wherein each of a period of time for detecting the first pressure and a period of time for detecting the second pressure is less than a period of time at a fundamental frequency in a rotational frequency of an internal combustion engine.

* * * * *